Dec. 23, 1941.  R. A. WINBORNE  2,267,386
CONTROL DEVICE
Filed July 5, 1940
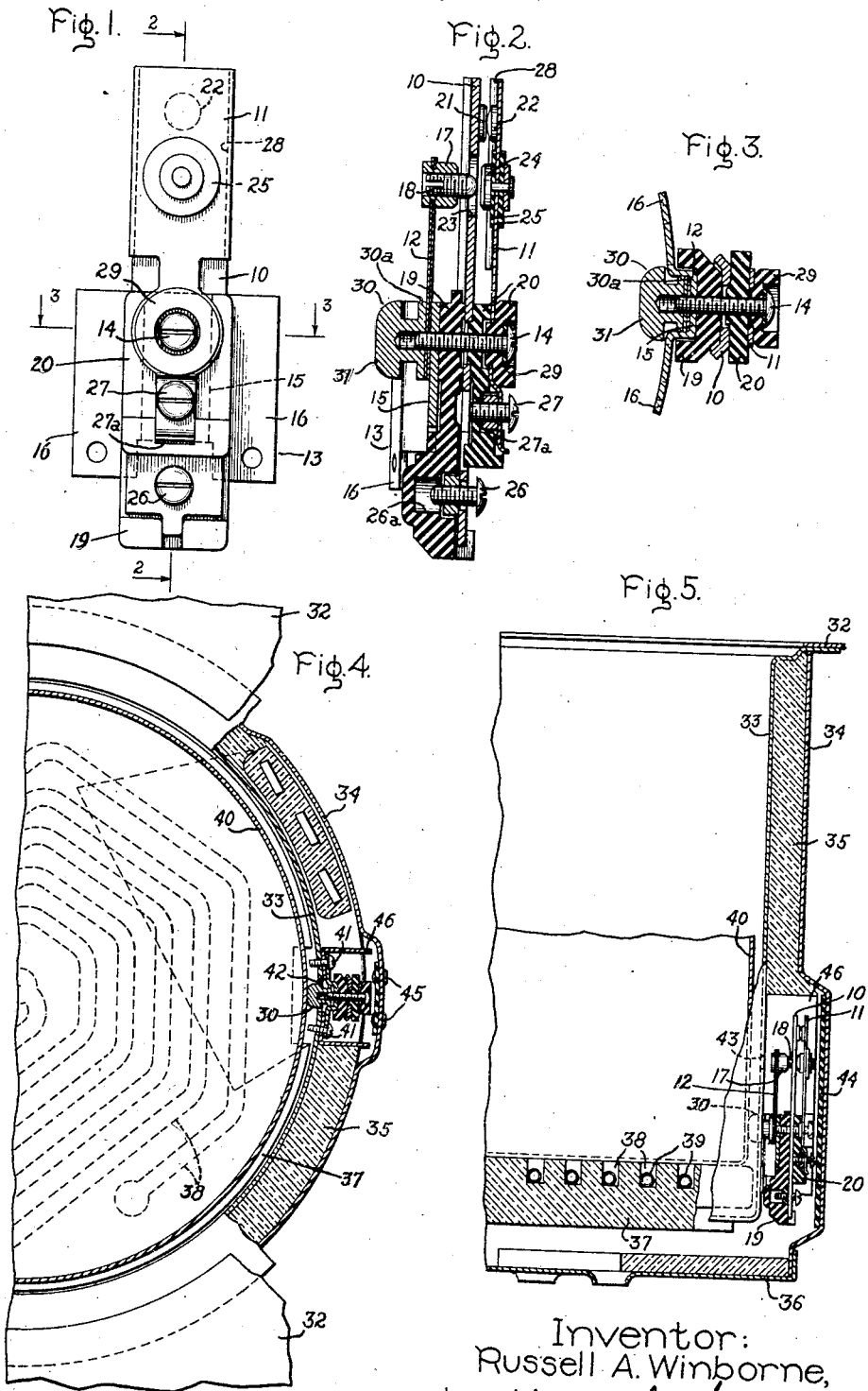
Inventor:
Russell A. Winborne,
by Harry E. Dunham
His Attorney.

Patented Dec. 23, 1941

2,267,386

UNITED STATES PATENT OFFICE 2,267,386

CONTROL DEVICE

Russell A. Winborne, Oak Park, Ill., assignor to Edison General Electric Appliance Company, Inc., Chicago, Ill., a corporation of New York Application July 5, 1940, Serial No. 343,996

4 Claims. (Cl. 200—138)

My invention relates to a control device and more particularly to an over-temperature control device and has among its primary objects the provision of a compact, rugged and efficient control device of this character which can be manufactured at low cost, can be readily assembled and can be quickly and easily mounted on the heating device with which it is to be used.

While not limited thereto, my invention relates to an over-temperature control device which can be used on an electric range. In the manufacture of electric ranges it has been customary to provide in place of one of the surface units on top of the range, a well type of cooker with which a cooking utensil in the form of a pail is adapted to be used. In previous installations of this type the well cooker has usually been of a relatively low wattage and the cooking operations performed therewith have of necessity been limited. In order to increase the avilability of the cooker for different cooking operations, such as deep fat frying and the like, it has been proposed to increase the wattage of the heating unit from 600 to 1200 watts and to provide a multiposition switch for controlling this unit. With the provision of such a high wattage unit in the well cooker, it is desirable to provide some form of over-temperature release for the heating circuit in order to prevent the pail or cooking utensil used with the cooker from melting due to the excessive temperatures attained when the utensil boils dry or is otherwise left unattended during a particular high heat cooking operation.

It is, therefore, a specific object of my invention to provide in the well cooker of an electric range a new and improved over-temperature control device which quickly and accurately follows the temperature of the utensil used in the well cooker so that when the temperature of the utensil attains or exceeds a predetermined safe value the heating unit of the well cooker is automatically deenergized.

It is a further specific object of my invention to provide an over-temperature control device of the aforementioned type which is constructed and arranged so that the component elements thereof and particularly the temperature responsive element is substantially unstressed during the normal operation of the heating device being controlled, for example, a well cooker, whereby the calibration of the over-temperature control device is maintained over a long period of time and the life of the control device is increased.

In accordance with my invention I have provided a control device which comprises a relatively stationary contact arm and a resilient contact arm mounted in spaced relation and carrying cooperating contacts at their free end. Spaced from both contact arms is a temperature responsive member which carries at its free end an adjusting screw which is adapted to engage the resilient contact arm and cause it to move away from the stationary contact arm to open the contacts upon the occurrence of a predetermined temperature. In order to insure that the control device will accurately respond to the temperature of the utensil being protected there is provided a conducting button which is mounted in good thermal contact with the temperature responsive element and with the utensil so that heat is rapidly conducted from the latter to the temperature responsive element. The control device is particularly constructed and arranged so as to have a high resistance to vibration or shock and to have a low operating stress on each of its operating elements. In addition, improved means are provided for adjusting the operating temperature of the control device.

For a more complete understanding of my invention, reference should be had to the accompanying drawing in which Fig. 1 is a front elevation of my improved control device; Fig. 2 is a sectional view of my improved control device taken on the line 2—2 of Fig. 1 looking in direction of arrows; Fig. 3 is a sectional view of my improved control device taken on the line 3—3 of Fig. 1, looking in direction of arrows; Fig. 4 is a fragmentary plan view of a well cooker for an electric range showing my improved over-temperature control device mounted thereon; and Fig. 5 is a fragmentary sectional view in elevation of a well cooker showing additional details of the application thereto of my improved over-temperature control device.

Referring now to Figs. 1-3 it will be observed that my improved over-temperature control device comprises a substantially rigid contact arm 10, a flexible contact arm 11 and a temperature responsive member 12. As shown, these members lie substantially parallel to each other and the resilient contact arm 11 and the member 12 lie on opposite sides of the relatively rigid contact arm 10. In order to provide a compact unitary structure the three elements 10, 11 and 12 are mounted in spaced relation on a single sheet metal supporting bracket 13 by means of a single bolt 14, the supporting bracket 13 having a centrally raised portion 15 and outwardly extending arms 16.

The temperature responsive element 12 comprises a bimetallic bar, as shown, formed of two metals having dissimilar temperature coefficients of expansion, such as invar and steel, rigidly secured together lengthwise as by welding. The bimetallic bar is rigidly secured at one end to the under side of the raised portion 15 of the clamping bracket and provided at its opposite or free end is an aperture in which is secured a sleeve 17. Threadedly mounted in the sleeve 17 is an adjusting screw 18 the function of which will be described more fully hereinafter.

As previously mentioned, the relatively rigid contact arm and the flexible contact arm are arranged substantially parallel to each other and are mounted in spaced relation on the bracket 13. In order to effect this spaced relationship and at the same time to insulate the elements from each other, elongated spacing blocks 19 and 20 made of some suitable insulating material, such as a phenolic condensation product, are provided to space the fixed arm from the upper surface of the bracket and the resilient arm from the fixed arm. Mounted near the free ends of the contact arms 10 and 11 are contact elements 21 and 22 respectively and the spacing block 20 is of such a height and the resilient member so formed that the contact 22 is normally biased against the contact 21 with a predetermined initial contact pressure.

As shown in Fig. 2, an aperture 23 is provided in the fixed arm 10 intermediate its fixed and free ends and a bearing lug or button 24 is mounted on the resilient arm 11 opposite the aperture 23, the lug or button 24 being preferably riveted to the resilient arm and insulated therefrom by strips of insulating material 25. It will be observed that the aperture 23 provided in the relatively fixed contact arm lies opposite the end of the bimetallic element 12. It is thus apparent that the end of the adjusting screw 18 is free to pass through the aperture 23 and engage the button 24. The bimetallic element 12 is arranged so as to be deflected to the right upon an increase in temperature. Thus, depending upon the adjustment of the screw 18, the bimetallic element will cause the resilient contact arm to be moved to the right upon the occurrence of a predetermined temperature to move the contact 22 out of engagement with the contact 21 and open the heating circuit controlled thereby.

As shown in the drawing, both the fixed ends of both contact arms extend beyond the fastening bolt 14. Provided on the extended portion of these arms are terminal members 26 and 27. Each of the spacing members 19 and 20 is elongated so as to serve as a terminal block and each is provided with suitable recesses 26a and 27a for receiving the ends of the terminal members 26 and 27, respectively. Moreover, in order to increase the rigidity of the control device and its resistance to vibration and shock, the relatively fixed contact arm 10 is given a channel-shaped construction as shown in Fig. 3 and reinforcing flanges 28 are provided along the edges of the flexible arm 11 adjacent the outer or free end thereof, as shown in Figs. 1 and 2.

As previously described, the component elements of my improved control device are secured together in spaced relation by means of the single bolt 14. After the component elements have been mounted on the bracket 13 in the aforedescribed spaced relation, the bolt is inserted through a suitable insulating member 29 and then through the assembly so that a nut 30 may be threaded thereon. Referring to Figs. 2 and 3, it will be observed that a portion of the insulating member 29 extends downwardly through an aperture provided in the resilient arm 11 so as to insulate the arm from the bolt and a portion of the separating block 20 extends downwardly into an aperture provided in the fixed contact arm 10 to insulate this arm from the bolt.

With control devices of the type to which this invention relates it is desirable that the bimetallic element thereof accurately follow the temperature of the device which is to be controlled. In order to achieve this function, it is essential that heat be rapidly conducted to the bimetallic element. In accordance with my invention I have arranged the bimetallic element so that it is in good metallic contact with the bracket 13 which is arranged to be mounted on a portion of the device being regulated. In addition, I have constructed the nut 30 in the form of an enlarged boss or abutment which, it will be observed, has a substantial flange 30a which lies in good metallic contact with the bimetallic element and has a head portion 31 which extends outwardly from the assembly so as to engage the surface of the device being controlled. This nut or button 30 is made of brass or some similar good conducting material so that the heat will be rapidly conducted to the bimetallic element.

In the operation of my improved control device, the adjusting screw 18 will be adjusted so as to operate the control device at the predetermined desired temperature. By rotating the adjusting screw so that the end thereof is moved outwardly to the right with respect to the bimetallic element, the temperature at which the control device operates will be decreased. By rotating the adjusting screw in the opposite direction, the temperature will be increased. With the adjusting screw properly adjusted for the predetermined desired temperature, the control device will be mounted in position in the heating device the temperature of which is to be controlled, care being taken to see that the conducting button 30 lies in good thermal contact with the device. Upon an increase in temperature of the device to or beyond that at which the control device is set to operate, the bimetallic element will be deflected to the right and the adjusting screw 18 mounted on the end thereof will move into engagement with the button 24 and will cause the resilient arm 11 to deflect to the right to move the contact 22 out of engagement with the contact 21 thereby opening the main heating circuit. Upon a decrease in temperature below that at which the control device is set to operate, the contacts 21 and 22 will be closed and the heating circuit again energized. It is thus apparent that I have provided a simple, inexpensive, easily assembled control device for use on heating appliances in general.

In Figs. 4 and 5 I have shown my improved control device as applied to the well cooker of an electric range. Not all of the structural details of the range or of the well cooker are shown in these figures. However, it is believed that sufficient detail is illustrated in order to make clear to those skilled in the art the manner in which my improved control device is applied to such a heating device in order to fully protect the device and the utensils used therewith from undesirable increases in temperature. As I have previously explained, most electric ranges now manufactured are provided with such well cookers and the present trend is to use higher wattages in such well cookers in order to increase the number of cooking operations which can be performed therewith.

Referring now more particularly to Figs. 4 and 5, it will be observed that the well cooker comprises an insulated container lying below the top surface 32 of an electric range. The container is substantially cylindrical in shape and has an inner liner 33 and an outer wall 34 between which is provided a layer of some suitable insulating material 35 such as rock wool. Arranged to close the lower end of the container is a bottom wall 36 and mounted in spaced relation with respect to the bottom wall is a heating plate 37 which comprises a block of suitable refractory material having a plurality of grooves 38 in which is located a suitable open coil heating element 39. In the particular construction being described the heating coil 39 is of a substantially high wattage, for example, approximately 1200 watts.

Arranged to be supported upon the heating element is a suitable cooking utensil 40 in which the article to be cooked is held. This utensil is usually in the form of a pail and is made of some good heat conducting material such as aluminum. In the use of such a utensil with the high wattage heating unit, there is considerable risk of melting the utensil should the heating unit be turned on to its full heat while the utensil is empty or should the utensil boil dry during a cooking operation. In order to prevent such an occurrence, my improved over-temperature control device is mounted between the inner and outer walls of the cooking well adjacent the bottom thereof, the supporting bracket 13 being fastened to the outside of the inner wall by means of screws 41. Provided in the inner wall 33 of the cooking well near the bottom thereof is an aperture 42 through which the conducting button 30 is adapted to extend and, as shown in Fig. 4, the conducting button is constructed so that the head 31 projects beyond the surface of the inner wall so that it can rest directly against the utensil 40. By means of this construction heat will rapidly be conducted from the cooker pail to the control device. Thus the control device will quickly and accurately follow temperature changes of the utensil and will operate to open the heating circuit when the utensil temperature exceeds a predetermined safe limit.

Provided in the inner wall above the aperture 42 is a second aperture 43 which is arranged to lie opposite the adjusting screw which is carried on the free end of the bimetallic element 12. By providing this second aperture, the adjusting screw is made readily accessible so that the safe operating temperature at which the control device opens the heating circuit may be adjusted after assembly in the well cooker.

In order to provide sufficient clearance for the control device, the outer wall 34 of the cooker is bulged somewhat at the lower end thereof and secured to the inner surface of this bulged portion by means of rivets 45 is a sheet of insulating material 44 which serves to insulate the control device from the outer shell of the cooker. In order to prevent the insulating material 35 from collecting around the control device a U-shaped flange or barrier 46 is arranged around the device and is secured in position by means of the screws 41.

The control device will be calibrated to operate at the predetermined safe limit temperature before it is mounted in position in the deep well cooker. However, should this calibration be improper or should the control device lose its calibration during the assembly operation, the adjusting screw may be readily reset by inserting a screw driver or the like through the aperture 43.

In the operation of my improved control device in the well cooker described above, the control operates merely as an over-temperature switch. As long as the well cooker is properly operated and the temperature thereof is maintained below the predetermined safe limit for which the control device is set, the bimetallic element 12 does not affect the position of the contacts 21 and 22. However, during this time, the bimetallic member 12 accurately follows the temperature of the cooking due to the good thermal contact between the element and the utensil through the conducting button 30. Should the utensil boil dry, however, or should the operator inadvertently turn the control switch on to high heat while the utensil is empty, the temperature of the utensil will rise rapidly and the bimetallic element 12 will follow this temperature rise very closely and will deflect to the right. Upon the occurrence of the predetermined temperature for which the control device is set, the bimetallic element will have deflected to the right an amount sufficient to cause the end of the adjusting screw 18 to move through the aperture 23 in the relatively fixed contact arm 10 and into engagement with the button 24 carried by the resilient arm 11 whereupon the flexible contact arm will be moved to the right to move the contact 21 out of engagement with the contact 22 and to shut off the heating circuit. Thereafter the utensil will cool off and the bimetallic element will deflect to the left causing the heating circuit again to be reclosed. If the operator has not discovered the condition existing in the well cooker, the pail will once again heat up and the control device will operate to open the heating circuit. This intermittent opening and closing of the heating circuit will continue until the operator discovers the existing condition. However, the temperature at which this cycling takes place is selected and adjusted so as to be well within the safe limit for the cooking utensil and the remaining parts of the well cooker so that damage does not result to these elements.

From the foregoing detailed description of my improved control device and the application thereof to the well type cooker of an electric range, it will be apparent that I have provided a new and improved control device which is rugged, efficient in operation, and simple and inexpensive to manufacture and assemble. It is to be particularly observed that I have provided a new and improved control device which is constructed and aranged so that the temperature responsive element thereof remains substantially unstressed during the normal operation of the cooking device being controlled. Such an arrangement insures maintenance of the calibration of the control device and increased life therefor. Both of these are of considerable importance in the particular application which I have made of my improved control device. Moreover, it will be observed that I have provided an over-temperature control device which may be readily mounted as a unit in the well type of cooker of an electric range and may be readily adjusted after mounting in its operative position.

While I have shown one modification of my improved control device and have described at length one application thereof, it will be apparent that many modifications may be made therein and many other applications may be made thereof. I, therefore, intend to cover in the appended claims all such modifications and applications of my improved control device as are within the true spirit and scope of my invention.

What I claim as new and desire to secure by Letters Patent of the United States is:

1. A control device comprising a support, a relatively rigid contact arm mounted on said support and having an aperture intermediate the ends thereof, a bimetallic element mounted on one side of said relatively rigid contact arm, a flexible contact arm mounted on the other side of said relatively rigid contact arm, means on the end of said bimetallic element adapted to extend through said aperture and engage said flexible contact arm to move said flexible arm away from said fixed contact arm after a predetermined deflection of said bimetallic element, and unitary means for fastening said contact arm to said element in said spaced relation on said support, said means including an enlarged member of good conducting material for rapidly conducting heat from the device being controlled to said temperature responsive element.

2. An over-temperature device adapted to be used with the well cooker of an electric range having inner and outer walls defining a receptacle and a cooking utensil located within said receptacle, comprising, a bracket adapted to be mounted on the outside surface of the inner wall of said receptacle, a bimetallic element mounted on said bracket, contact means adapted to be actuated by said bimetallic element, and means mounted in good metallic contact with said bimetallic element and adapted to extend through said inner wall and into engagement with said utensil for rapidly conducting heat to said bimetallic element so that said bimetallic element deflects to cause said contact means to be operated upon the occurrence of a predetermined safe temperature rise for said utensil.

3. An over-temperature control device for an electric cooker having inner and outer walls defining a receptacle and a cooking utensil positioned within said receptacle, comprising a bracket adapted to be mounted on the inner wall of said receptacle, a bimetallic element mounted on the under side of said bracket, a relatively rigid contact arm having an aperture therein and a relatively flexible contact arm mounted in spaced parallel relation on the opposite side of said bracket, contact means associated with said contact arms so as to perform a circuit controlling function upon the movement of said flexible arm relative to said rigid arm, means on said bimetallic element adapted to extend through said aperture to engage and move said flexible contact arm after a predetermined movement of said bimetallic element, and means secured in good metallic contact with said bimetallic element and adapted to extend through said inner wall of said receptacle to engage said cooking utensil for rapidly conducting heat from said cooking utensil to said bimetallic element to cause said bimetallic element to deflect in accordance with the temperature of said utensil and upon the occurrence of a predetermined safe temperature rise for said utensil to produce movement of said flexible arm away from said rigid contact arm an amount sufficient to open said contacts carried by said arms.

4. An over-temperature control device for an electric cooker having a wall defining a receptacle and a cooking utensil positioned within said receptacle comprising a bracket adapted to be mounted on the wall of said receptacle, a bimetallic element mounted on the under side of said bracket, a relatively rigid contact arm having an aperture therein and a relatively flexible contact arm mounted in spaced parallel relation on the opposite side of said bracket, contact means associated with said contact arms so as to perform a circuit controlling function upon movement of said flexible arm relative to said rigid arm, means on said bimetallic element adapted to extend through said aperture to engage and move said flexible contact arm after a predetermined movement of said bimetallic element, a bolt for fastening said arm and said element in said spaced relation on said bracket, and an enlarged nut of good heat-conducting material cooperating with said bolt to secure said arms and said element on said bracket, said nut having an enlarged surface in good thermal contact with said bimetallic element and having a head portion adapted to extend through the wall of said receptacle to engage said cooking utensil for rapidly conducting heat from said utensil to said bimetallic element to cause said element to deflect in accordance with temperature of said utensil and upon the occurrence of a predetermined safe temperature rise for said utensil to produce movement of said flexible contact arm away from said rigid contact arm an amount sufficient to open said contacts carried by said arms.

RUSSELL A. WINBORNE.